April 3, 1962    S. E. GILMORE    3,027,911
PLASTIC SEAL RING VALVE
Filed Aug. 27, 1958
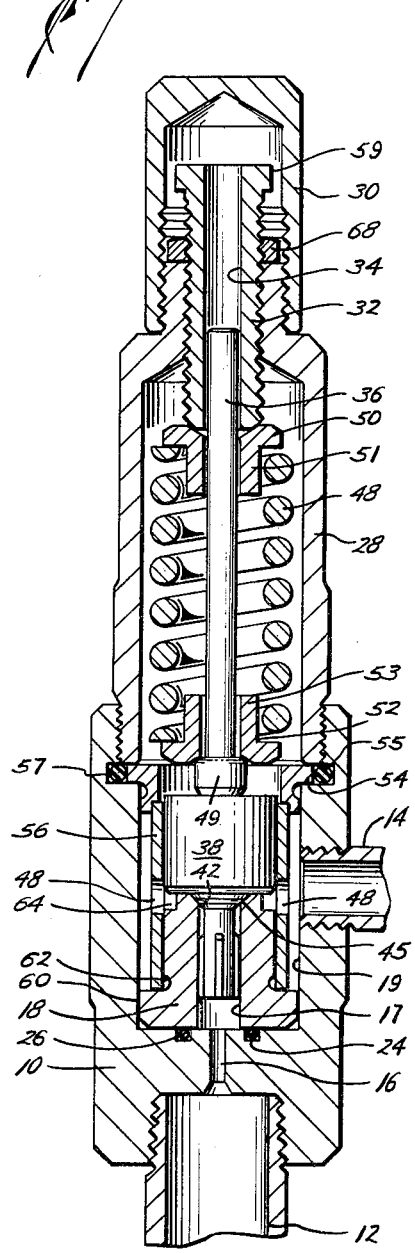
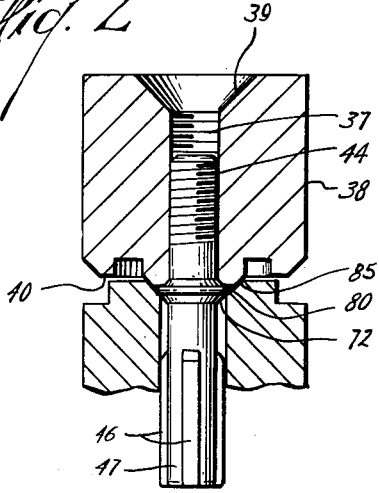
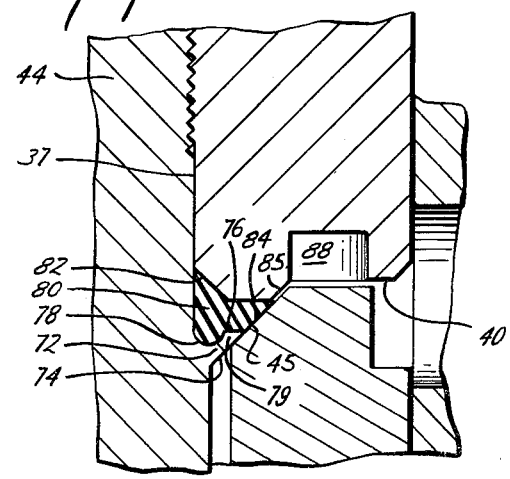
Samuel E. Gilmore
INVENTOR.
BY
ATTORNEY

United States Patent Office 3,027,911
Patented Apr. 3, 1962

3,027,911
PLASTIC SEAL RING VALVE
Samuel E. Gilmore, Bellaire, Tex., assignor to Fluid Mechanics, Inc., Houston, Tex., a corporation of Texas
Filed Aug. 27, 1958, Ser. No. 757,528
12 Claims. (Cl. 137—469)

This invention pertains to valves. More particularly, this invention pertains to spring loaded high pressure safety valves useful for protecting pressure vessels containing gas or liquid from pressure build up, which units may have replaceable valve seats and closure elements.

The principal object of the invention is to provide a valve in which the closure element will engage and seal with the seat element even after long and severe usage.

Another object of the invention is to provide a valve having a composite resilient plastic and rigid metal closure element that will provide an unusually efficient seal and which is as durable and reliable as less efficient, wholly rigid elements.

A further object is to provide a relief valve whose "opening" pressure is much higher than its "stay open" pressure.

A still further object of the invention is to provide a pressure relief valve, for both liquid and gaseous fluids, having a replaceable closure element that has durable resilient plastic and rigid wearing surfaces which tends to engage and conform to its valve seat, even if the closure and seat elements are worn or irregular.

A still further object of the invention is to provide a valve with a composite resilient plastic and rigid closure element that is inexpensive to manufacture and maintain, and, at the same time is durable and reliable in operation.

Another object of the invention is to provide a pressure relief valve that tends to resist nozzle clogging and that can function even if small amounts of foreign material do become lodged therein.

Another object of the invention is to provide a valve having a composite resilient plastic and rigid closure element, the resilient material of which is not subject to scuffing and tearing during the operation of the valve and which resilient plastic material is not distorted or pulled away from its anchorage by such action.

Briefly, the invention comprises a cylindrical composite closure element with a laminated, stepped, tapered face and a removable annular tapered seat. The closure element is positively guided and spring biased to close. The composite character of the closure element, or valve, is novel in both material and structure. The annular seat is a beveled counterbore of an axial passage in the valve seat body and is of slightly greater width than the lower part of the tapered face of the closure element, and has a polished surface to enhance the wearing qualities of the composite closure element. The closure element or valve is a laminated, truncated cone having a metal nose or portion nearest the apex which seats on the lower portion of the beveled annular seat. Under normal conditions, the nose effects a seal immediately upon contact with the seat. The upper periphery of the metal nose is formed as a lip for flexibility. A disc like body of resilient plastic material lies immediately above the nose part and in full contact therewith and with the lower part of the cylindrical valve body. The lower portion or nose of the cone and the intermediate, resilient plastic portions thereof have the same taper and form a smooth conical face. The upper metal portion of the stepped cone has the same taper but the radius of its lowest edge is less than that of the upper edge of the resilient plastic body. Also, a reaction chamber or groove is located around the base of the stepped, truncated cone. The flexing of the upper periphery of the metal nose portion causes the compression and outward flow of the resilient plastic material of the disc which forms a plastic seal between the valve and the seat.

Among the advantages of the foregoing construction may be mentioned the fact that the tight seal effected and the resultant lessening of "simmering" or leakage allows the disposition of a reaction chamber in close proximity to the base of the tapered face of the valve closure element in which position it is more effective.

The plastic sealing mechanism also assures a seal even if seat and closure elements are worn, irregular, or do not exactly interfit for some other reason.

A further advantage of the invention is the combining of its superior sealing characteristics with great strength and durability.

Another advantage is the greater degree of parts interchangeability afforded by the adaptability of the composite closure element to any seat element.

Another advantage of the invention is that the very flexing of the metal portions of the tapered portion of the valve that causes the extrusion of the resilient material, also more firmly anchors the resilient plastic disc element, thereby lessening the possibility of tearing the plastic disc away from its anchorage.

Other objects and advantages of the invention will appear from the following description of a preferred embodiment thereof, reference being made to the accompanying drawings wherein:

FIGURE 1 is a sectional view of a safety relief valve embodying the invention; and FIGURE 2 is a sectional view of the valve body in FIGURE 1.

FIGURE 3 is an enlarged fragmentary section of the composite valve closure element and the seat therefor in FIGURE 2.

Referring now to FIGURES 1 and 2, the valve comprises a tubular body or barrel 10, having a threaded inlet 12 and outlet 14. An axial passage 16 communicates between inlet 12 through the base of barrel 10 and the bore 17 of the valve seat body 18 which is disposed in bore 19 of barrel 10.

The removable cylindrical valve seat body 18 is disposed in the lower end of bore 19 and forms a seal with the lower inside surface of barrel 10 around passage 16 by means of horizontal annular groove 24 and O-ring 26 disposed therein.

The upper portion of barrel 10 is threadably joined to cylindrical valve bonnet 28 which has hollow cap 30 threadably attached to and closing the upper end thereof.

Bonnet 28 has a threaded sleeve or cylindrical body 32 screwed into the upper end thereof. Axial passage or bore 34 through sleeve 32 has spring post 36 slidably disposed therein, the opposite end of which spring post bears upon valve closure element or valve 38. Valve 38 has a lower annular horizontal face 40 and composite stepped tapered face 42 concentric therewith, which face 42 engages and seals with annular seat 45 which has the same taper as the lower portion, or step, of face 42, and is polished. Valve 38 has a threaded axial passage 37 therethrough in which guide stem or member 44 is screwed and an upper counterbore 39. The lower portion 47 of guide stem 44 has radially disposed, outwardly extending vertical flanges or vanes 46 in slidable contact with the inner bore 17 of valve seat body 18.

A helical bias spring 48 is disposed about spring post 36 between upper and lower spring plates 50 and 52 respectively and is centered on each of such plates by flanges 51 and 53 respectively. Spring plate 52 rests on annular shoulder 49 of spring post 36 which shoulder is lodged in counterbore 39 of valve 38.

A flanged ring 54 is disposed around the upper portions of valve 38 between bonnet 28 and barrel 10 in bore 19 and is sealed therewith by means of O-ring 55 in annular groove 57. A hollow cylindrical valve guide sleeve 56 having ports 48 at the level of valve seat 45, in the walls thereof surrounds seat body 18 and valve 38 and is held between flanged ring 54 and the outwardly extending annular flange 60 around the base of valve seat body 18. Seat body 18 has upper and lower annular stress relief grooves 64 and 62 respectively in the outer surface thereof. Annular groove 64 is at the top of seat body 18.

At the upper portion of the unit, threaded sleeve 32 bears upon upper spring plate or disc 50. The uppermost portion of sleeve 32 has hexagonal lateral surfaces or flats 59 which may be gripped by a wrench to adjust the compression of spring 48. Lock ring or annular body 68 is disposed around and threadably engages sleeve 32 and cap 30.

Referring now to FIGURES 2 and 3, guide member 44 is disposed inside axial passage 37 in valve 38 and is threadably attached thereto. The tapered undersurface 74 of annular shoulder 72 of guide 44 forms the lowermost portion or nose of stepped, tapered face 42. The step, or offset of tapered face 42 is formed by outer face 84 of disc 80, the upper edge of which has a greater radius than the lower edge of tapered face 85 of valve 38. The underside 74 of shoulder 72 has the same taper as the outer face 84 of resilient disc body 80. The upper horizontal surface 76 of shoulder 72 has a concentric annular stress relief groove 78 therein forming a flexible lip 79 around the periphery of shoulder 72. The middle portion of the tapered face 42 comprises an annular, disc like body 80 of resilient plastic material which is disposed around guide stem 44 and lies between upper surface 76 of shoulder 72 and valve 38. The plastic material of body 80 fills stress relief groove 78 and counterbore 82 of passage 37. Since upper face 85 of the valve closure element is slightly narrower than face 84 of disc 80, there is clearance between face 85 and seat 45 when the closure element is only resting on seat 45, e.g. without having closing pressure exerted thereon.

An annular "huddling" or reaction chamber 88 is formed in the lower face of valve 38 surrounding and contiguous with the base of the stepped, connical valve closure element and the clearance between valve 38 and seat 45 opens directly into such reaction chamber.

In operation, fluid under pressure enters through inlet 12, passes through axial passage 16 of barrel 10, bore 17 of valve seat body 18, between vanes 46 and around the stem 47 of guide member 44 and up to valve face 42 of composite valve 38 which is seated against valve seat face 45. Downwardly disposed, stepped tapered face 42 is normally held in such position by the pressure of bias spring 48 bearing against lower spring plate 52 which in turn bears on annular shoulder 49 of spring post 36, which in turn bears upon counterbore 39 in the top of valve 38, holding face 42 down on seat 45 against the upward pressure of the fluid. The movement of valve 38 is guided by sleeve 56.

The downward force exerted by spring 48 is adjustable by means of threaded sleeve 32 bearing on upper spring plate or keeper 50, which sleeve 32 can be screwed downwardly to increase the compression of bias spring 48. The adjusted position of sleeve 32 and spring 48 is held by lock ring 68. The downward pressure of spring 48 forces stepped tapered face 42 of valve 38 to engage and seal with seat 45, the polished surface of which seat reduces wear of face 42, particularly of tapered face 84 of plastic disc 80. In the closing process, tapered under surface 74 of annular shoulder 72 first engages and seals with seat 45. Continued downward pressure causes lip 79 of shoulder 72 to flex inwardly, compressing stress relief groove 78 which causes plastic material of disc 80 to flow outwardly, slightly increasing the radii of its tapered outer surface 84. This slightly protruding plastic material contacts and seals with seat 45, thereby forming a plastic compression seal. Tapered metal face 85 of valve 38, being stepped inwardly from face 84 of disc 80, finally forms a metal to metal seat with seat 45 above face 84 of disc 80 and confines and compresses the plastic material of the latter to enhance the sealing qualities of the valve assembly. The resilient and plastic character of disc 80, coupled with the peripheral flexibility of lip 79, insures a seal with seat 45, even if such seal is irregular, worn, or both, or if the valve has been renewed without the renewal of the seat or vice versa, and which plastic seal eliminates the need of lapping or fitting of individual valves to mating seats. The step, or clearance between upper face 85 and the upper portion of seat 45 allows the flow of plastic material 80 to fully engage seat 45 before the downward pressure of spring 48 causes the final metal to metal seal above the plastic face.

The inward pressure of flexible lip 79 helps to anchor disc 80 in position as does the portion of such disc disposed in counterbore 82.

When entering fluid pressure reaches a predetermined magnitude, the downward pressure of spring 48 is overcome, valve 38 is lifted off seat 45 and the fluid passes therebetween into reaction chamber 88 where, if it is compressed gaseous fluid, its kinetic and expansion energy is transmuted into sufficient upward static pressure to rapidly increase the opening force exerted upon valve 38. Since all safety relief valves are subject to some "simmering" or leakage, reaction chambers are not normally located directly in the path of fluid flowing through the valve seat. However, the unusual sealing qualities of the composite flexible steel and resilient plastic valve allow the placement of the reaction chamber directly in the flow path of the pressurized fluid, thereby increasing the effectiveness of the reaction chamber and the efficiency of the safety relief valve. The fluid then passes between the lower face 40 of valve 38, through upper relief groove 64 and into cylinder bore 19 through ports 48 in sleeve 56, which, in the case of gaseous fluids, the labyrinthine path slows the attenuation of the gaseous fluid and aids the reaction chamber in keeping the relief valve open longer than it would if the fluid were allowed to escape to atmosphere immediately after leaving reaction chamber 88. The annular space between sleeve 56 and bore 19 contributes to the confinement and aforesaid transmutation of the kinetic energy of the fluid to a lesser degree. Thus "stay open" pressure is considerably less than "opening" pressure. After the pressure in the protected vessel is reduced by the flow through the valve, the force holding the valve open is rapidly reduced as the aforesaid transmuted upward static pressure falls, and the bias spring 48 is able to exert excess closing pressure whereby closure element 38 is "snapped" back into seat 45 and a much better seal is obtained than would be possible if only a "soft" or gradual seating were used.

When it becomes necessary to replace either or both valve and seat, the bonnet 28 is unscrewed, flanged ring 54 is removed, followed by valve 38, sleeve 56 and seat body 18. After the replacement of valve and seat, bonnet 28 is replaced and screwed into barrel 10 until stopped by ring 54.

While a preferred embodiment of the invention has been shown and described, many modifications thereof can be made by one skilled in the art without departing from the spirit of the invention and it is desired to protect by Letters Patent all forms of the invention falling within the scope of the following claims.

I claim:

1. A composite rigid and plastic valve closure element comprising a rigid upper portion, a median portion of reduced diameter and a lower portion spaced apart from said upper portion, which lower portion has a maximum diameter greater than said median portion and less than said upper portion, which upper portion has a lower horizontal annular face and a concentric depending bead of lesser diameter than said lower face and greater than said median and lower portions, the outer walls of said bead being tapered inwardly from top to bottom and which lower portion has a horizontal upper surface with a concentric stress relief groove formed therein near the periphery thereof, the undersurface of which lower portion is tapered inwardly from the outer periphery of said upper surface, the taper of which is the same as the outer surface of said depending bead, and a resilient plastic body disposed and filling the area between said depending bead of said upper portion and said upper surface of said lower portion, the upper periphery of which plastic body extends beyond the lower periphery of said bead and the outer surface of which resilient plastic body has the same taper as said lower portion.

2. A composite resilient plastic and metal valve closure element comprising an upper rigid section, a spaced apart tapered lower rigid section, a flexible ridge around the upper periphery of said lower rigid section, means rigidly connecting said upper and lower rigid sections, and a tapered resilient plastic member disposed and occupying all the space between said upper and lower rigid sections.

3. A composite resilient plastic and metal valve closure element comprising an upper rigid section, a spaced apart lower rigid section, a flexible ridge around the upper periphery of said lower rigid section, the periphery of said flexible ridge being tapered so as to increase in size progressing upwardly, means rigidly connecting said upper and lower rigid sections, and a resilient plastic member disposed and occupying all the space between said upper and lower rigid portions, the lower periphery of said reslient member being substantially coextensive with the upper periphery of said flexible ridge and the periphery of said resilient member being tapered so as to increase in size progressing upwardly therefrom.

4. A composite resilient plastic and metal valve closure element as defined by claim 3 wherein said flexible ridge extends upwardly beyond a portion of said resilient plastic member.

5. A composite resilient plastic and metal valve closure element as defined by claim 3 wherein said flexible ridge is defined by a groove in the top surface of the lower rigid section.

6. A valve and seat combination wherein said valve comprises an upper rigid section, a spaced apart tapered lower rigid section, a flexible ridge around the upper periphery of said lower rigid section, means rigidly connecting said upper and lower rigid sections, and a tapered resilient plastic member disposed and occupying all the space between said upper and lower rigid sections, and wherein said seat is a rigid element tapered to cooperatively engage said flexible ridge and said tapered resilient plastic member.

7. A valve and seat combination wherein said valve comprises an upper rigid section, a spaced apart lower rigid section, a flexible ridge around the upper periphery of said lower rigid section, the periphery of said flexible ridge being tapered so as to increase in size progressing upwardly, means rigidly connecting said upper and lower rigid sections, and a resilient plastic member disposed and occupying all the space between said upper and lower rigid portions, the lower periphery of said resilient member being substantially coextensive with the upper periphery of said flexible ridge and the periphery of said resilient member being tapered so as to increase in size progressing upwardly therefrom, and wherein said seat comprises a cylindrical body having an axial passage therethrough, the top of said body being tapered so as to decrease in size progressing downwardly to cooperatively engage the tapered surfaces of said flexible ridge and said resilient member.

8. A valve and seat combination as defined by claim 7 wherein said flexible ridge extends upwardly beyond a portion of said resilient member.

9. A valve and seat combination as defined by claim 7 wherein said flexible ridge is defined by a groove in the top surface of the lower rigid section.

10. A valve closure element comprising a rigid upper portion, a median portion of reduced diameter and a lower portion spaced apart from said upper portion, said lower portion having a maximum diameter greater than said median portion and less than said upper portion, the part of the lower fact of said upper portion closest to and extending around said median portion having a bevel therearound adjacent to said median portion, the bevel flaring downwardly and having a maximum diameter intermediate the diameters of said lower and median portions, a substantially concentric groove in the upper surface of said lower portion, the periphery of said lower portion being tapered so as to decrease in size progressing downwardly, and a resilient plastic body disposed and filling the area between the upper and lower portions, the lower periphery of said resilient body having substantially the same diameter as the top of the lower portion, and the periphery of said resilient body having the same taper as the periphery of the lower portion.

11. A fluid pressure relief valve comprising a base having an inlet and an outlet, a hollow bonnet releasably attached to said base, a hollow cap releasably attached to said bonnet, a removable valve seat element having a passage therethrough communicating between said inlet and said outlet, a composite resilient plastic and metal valve closure element, means mounting said closure element for reciprocating movement coaxial with said passage through said valve seat element, and means engaging said valve closure element and said bonnet urging said closure element to engage and seal with said seat element, wherein said seat element comprises a cylindrical body having an axial passage having an upper outlet end and a lower inlet end directly communicating with said inlet in said base, and having a polished, inwardly tapered surface at the upper end thereof forming a counterbore around the upper end of said axial passage; and wherein said closure element comprises a rigid cylindrical body having an upper end and a lower end, a threaded axial passage therethrough, a depending annular bead on the lowest surface thereof surrounding the lower opening of said axial passage, the inner and outer surfaces of said bead being tapered outwardly and inwardly respectively, a rigid shaft disposed in and threadedly joined with said axial passage and extending below said depending bead, an annular shoulder around said shaft spaced below said depending bead, the lower surface of which shoulder is tapered inwardly from the periphery of the upper surface thereof, which upper surface is horizontal and has an annular, concentric stress relief groove formed therein, and a resilient plastic body filling all of the space between said bead and said shoulder and extending radially outwardly beyond said bead, the exposed surface of said resilient body having the same taper as the outer surface of said bead and the lower surface of said shoulder, which taper is the same as that of said valve seat and the outer surface of said bead.

12. A fluid pressure relief valve comprising a base having an inlet and an outlet, a hollow bonnet releasably attached to said base, a removable valve seat element having an axial passage therethrough having an upper outlet end and a lower inlet end whereby said axial passage communicates between the inlet and outlet in said base, a valve closure element reciprocable coaxially with said valve seat passage, and means resiliently urging said closure element into sealing engagement with said seat element, wherein said closure element comprises an upper rigid section, a spaced apart tapered lower rigid section, a flexible ridge around the upper periphery of said lower rigid section, means rigidly connecting said upper and lower rigid sections, and a tapered resilient plastic member disposed and occupying all the space between said upper and lower rigid sections, and wherein said seat element is a rigid element tapered to cooperatively engage said flexible ridge and said tapered resilient plastic member.

References Cited in the file of this patent

UNITED STATES PATENTS

| | | |
|---|---|---|
| 1,032,482 | Jerauld | July 16, 1912 |
| 1,143,027 | Blanchard | June 15, 1915 |
| 1,668,453 | Graesser | May 1, 1928 |
| 2,457,492 | Raybould | Dec. 28, 1948 |
| 2,628,632 | Dayton | Feb. 17, 1953 |
| 2,820,474 | Greenwood | Jan. 21, 1958 |
| 2,900,999 | Courtot | Aug. 25, 1959 |